Sept. 29, 1959 M. J. FLYNN 2,906,483
LEVELING ADJUSTMENT FOR DUMPY LEVELS AND THE LIKE
Filed Oct. 17, 1955 3 Sheets-Sheet 3

INVENTOR.
Maurice J. Flynn

Attorneys

United States Patent Office 2,906,483
Patented Sept. 29, 1959

2,906,483

LEVELING ADJUSTMENT FOR DUMPY LEVELS AND THE LIKE

Maurice J. Flynn, San Francisco, Calif.

Application October 17, 1955, Serial No. 540,847

4 Claims. (Cl. 248—180)

This invention relates to mechanical adjusting devices, and in particular to an improved leveling adjustment for engineers' dumpy levels and the like.

Engineers' dumpy levels and other surveying instruments have a leveling device which generally comprises two substantially horizontal members that may be adjusted in their relative positions. A lower one of these horizontal members, called a leveling plate, is attached to a tripod or other support, and an upper one of the horizontal members, called a star piece, supports a vertical spindle attached to a table carrying a telescope and a spirit level. For accurate leveling work, the star piece must be adjusted to a precisely level position while the leveling plate is supported by the tripod in a position that is only approximately level. For this purpose, a plurality of adjusting screws are generally provided between the star piece and the leveling plate for adjusting their relative positions.

Since precision adjusting screws must be used in an accurate surveying instrument, any dust or other foreign substance that might get into the screw threads is very objectionable, not only because of the immediate effect that such foreign substances have upon the operation of the adjusting screws, but also because of the increased wear of the screw threads which dust and other foreign substances can produce. This is a serious disadvantage of conventional adjusting screws, because surveying instruments must often be used in dusty locations.

Accordingly, an object of this invention is to provide an improved leveling adjustment for dumpy levels and the like in which dust and similar foreign substances cannot reach the screw threads. Other objects and advantages will appear as the description proceeds.

Briefly stated, in accordance with one aspect of this invention, an improved leveling adjustment comprises an externally threaded non-rotative screw coaxially disposed within a cylindrical cavity in each arm of the upper horizontal member or star piece of the leveling device. The lower end of this cavity is open, while the upper end of the cavity is closed. An internally threaded rotative sleeve fits snugly into the open lower end of the cavity and mates with the non-rotative screw. A ball-and-socket joint at the lower end of the sleeve bears against the lower horizontal member or leveling plate of the leveling device so that the relative positions of the star piece arm and the leveling plate can be adjusted by rotating the sleeve. The sleeve has an adjusting wheel so that it can be rotated easily.

Figure 1:
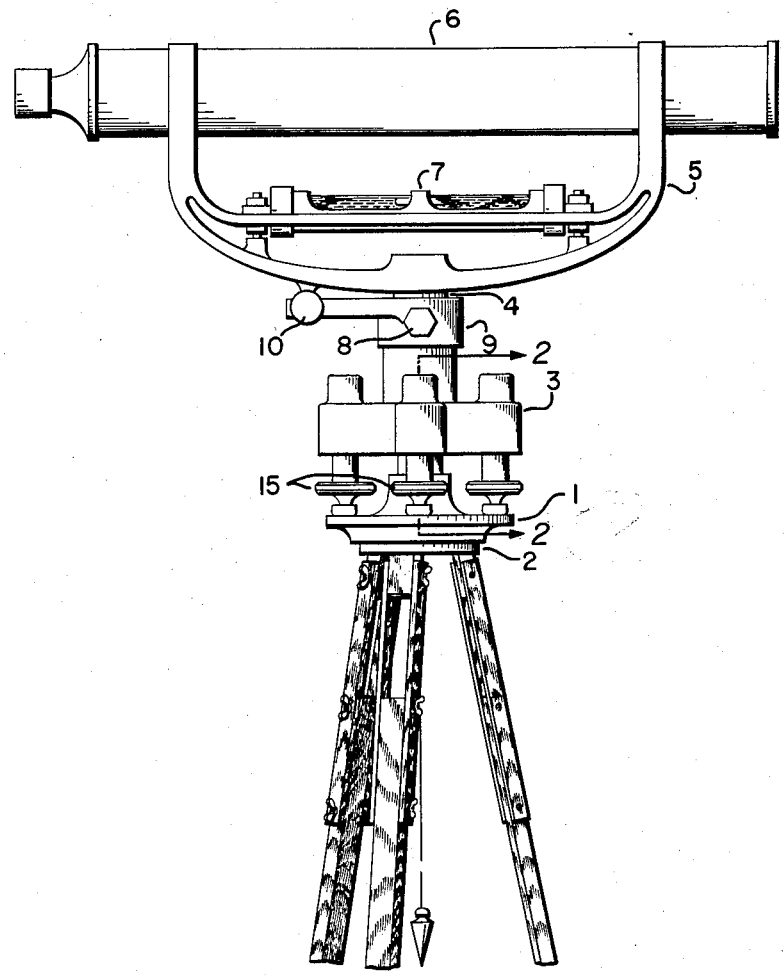
Fig. 1 is a side elevation of an engineer's dumpy level having a leveling adjustment embodying principles of this invention.

Referring to the drawings, an engineer's dumpy level comprises a leveling plate 1 that is attached to and is supported in an approximately horizontal position by a conventional tripod 2. A star piece 3 supports a vertical spindle 4 attached to a rotative table 5 upon which a conventional telescope 6 and spirit level 7 are mounted. Table 5, together with telescope 6 and spirit level 7, may be rotated in the horizontal plane and may be secured in any desired azimuth position by tightening the set screw 8 of a clamp 9. Fine adjustments in the azimuth angle may be made by adjusting a tangent adjusting screw 10. If star piece 3 is exactly level, the line of sight through telescope 6 is horizontal for all azimuth positions. Since leveling plate 1 is supported by tripod 2 in a position that is only approximately horizontal, means must be provided for accurately adjusting the relative positions of star piece 3 and leveling plate 1. The present invention is concerned with improvements in this adjusting means, which will now be described.

Star piece 3 has four horizontal arms that extend outward at right angles to one another. At the end of each arm there is an adjusting device that bears against the top of leveling table 1, so that the spacing between the leveling table and each arm of the star piece can be individually adjusted. Conventional adjusting screws heretofore used for this purpose are subject to the disadvantages hereinbefore pointed out largely due to the fact that dust and other foreign substances may get into the screw threads. The improved adjusting device provided by this invention overcomes these difficulties and disadvantages.

Figure 2:
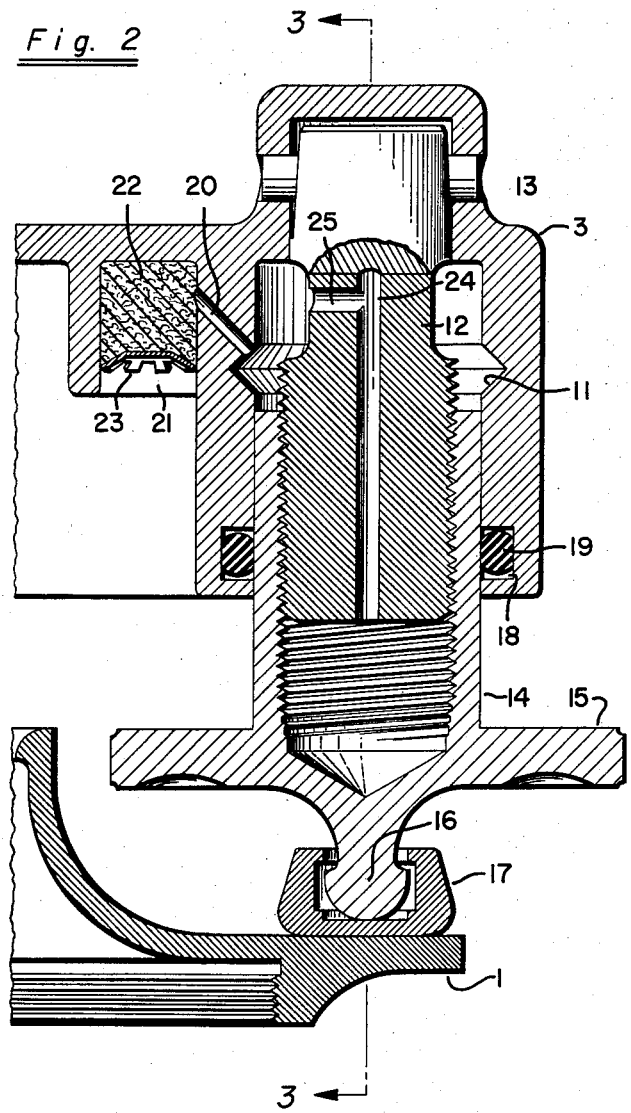
Fig. 2 is a fragmentary section of the leveling adjustment taken generally along the line 2—2 of Fig. 1.
Figure 3:
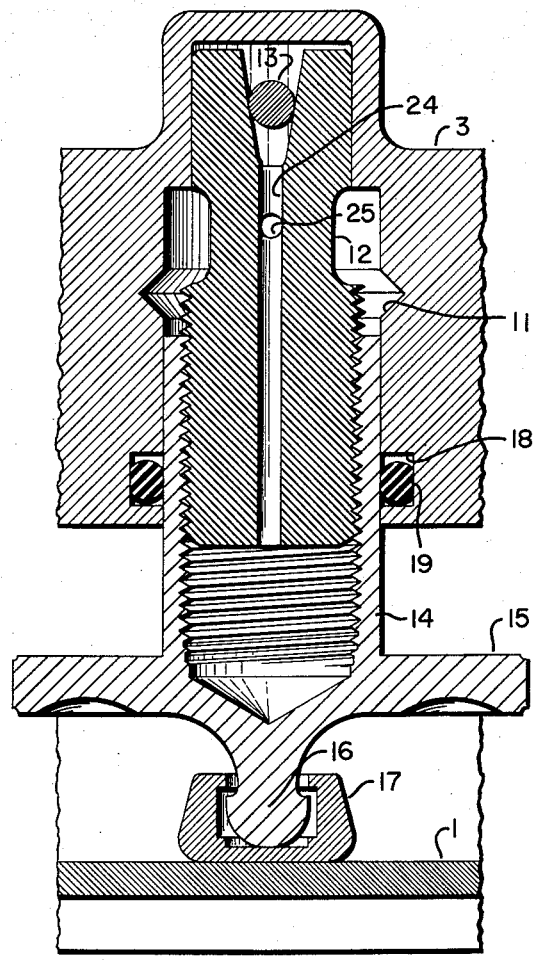
Fig. 3 is a fragmentary section taken along the line 3—3 of Fig. 2.

The four adjusting devices associated with the four arms of star piece 3 preferably are identical, and consequently only one such device need be described in detail. Referring in particular to Figs. 2 and 3 of the drawings, a horizontal arm of star piece 3 contains a vertical cylindrical cavity 11 that is open at its lower end and closed at its upper end, as shown. An externally threaded vertical screw 12 is disposed coaxially within cavity 11 and is non-rotatively connected to star piece 3 by means of a pin 13 that passes transversely through the upper portion of the cavity and engages a slot in the top of screw 12, as is best shown in Fig. 3. An internally threaded vertical sleeve 14 fits snugly into the open end of cavity 11 and mates with the externally threaded screw 12, as shown. An adjusting wheel 15, which preferably is integral with the lower end of sleeve 14, provides a convenient means for rotating the sleeve.

A ball 16 integral with the lower end of sleeve 14 mates with a socket 17 that bears against the top of leveling plate 1. Whenever adjusting wheel 15 is rotated to rotate sleeve 14, the mating threads of sleeve 14 and screw 12 cause the sleeve to move inward or outward with respect to cavity 11, which adjusts the spacing between leveling plate 1 and one arm of star piece 3. By individually rotating the sleeves of the four adjusting devices respectively associated with the four arms of star piece 3, it is evident that the star piece can be adjusted to a precisely level position.

Adjacent to the open end of cavity 11 there is a circumferential groove 18 in the cylindrical wall of the cavity. Groove 18 contains an annular gasket 19 that extends around the cylindrical outer surface of sleeve 14 in close contact therewith to prevent the entry of dust and other foreign substances through the space between the cylindrical wall of cavity 11 and the outer surface of sleeve 14. Preferably gasket 19 is an O-ring made of a resilient material such as rubber and having a size such that it is slightly compressed between the walls of groove 18 and the outer surface of the sleeve 14. The lower end of sleeve 14 is closed, as shown, to prevent the entry of dust and other foreign substances into the threaded interior of the sleeve.

It will be noted that there is a substantially closed air chamber between the upper end of sleeve 14 and the closed end of cavity 11, and that the volume of this chamber changes when sleeve 14 is rotated and thereby moved inward or outward with respect to the cavity. To prevent these volume changes from creating pressure differences that would tend to pump air, and consequently dust, past the gasket 19, an air passageway comprising a small hole 20 and a larger hole 21 is provided betwen the upper portion of the recess 11 and the atmosphere, so that pressure differences are substantially equalized. To prevent the entry of dust and other foreign particles through this passageway, an air filter 22 is provided within the larger hole 21 for filtering the air that passes through the passageway. The filter 22 may be made from any suitable filter material, such as glass wool, held in place by a slotted cap 23. It will be noted that the air filter is located in the hollow underside of star piece 3, in which position it is relatively well protected from rain and other deleterious influences.

There is another substantially closed air chamber between the bottom end of screw 12 and the closed end of sleeve 14, and this air chamber also changes in volume when adjustments are made. To equalize the pressure in this chamber with that in the chamber at the upper end of cavity 11, an air passageway is provided by boring an axial hole 24 and a transverse hole 25 in the screw 12, as shown. This passageway permits the use of tight-fitting screw threads, and prevents the pumping of air past the screw threads when adjustments are made.

From the foregoing description it will be seen that an adjusting device has been provided in which there is little possibility of dust or other harmful foreign substances getting into the screw threads. All pressures in enclosed air chambers are substantially equalized with atmospheric pressure, so that there is no pumping action that can force dust-carrying air past the sealing gasket. Air that enters the enclosed chambers of the adjusting device passes through the air filter 22, which removes dust and other foreign particles.

Various modifications and alternative constructions may be employed that utilize the broader principles of this invention. For example, in place of the O-ring 19, an annular air filter, such as a compressible semi-porous felt washer, may be positioned within groove 18 to permit the entry of filtered air into the variable-volume air chambers through the space between the cylindrical cavity wall and the cylindrical outer surface of sleeve 14. With this alternative construction, passageway 20—21, air filter 22 and cap 23 may be omitted. Furthermore, star piece 3 may have three rather than four arms, in which case there need be only three adjusting devices in the leveling adjustment of the level. The cavity containing screw 12 may be defined by some member other than star piece 3, by an outer sleeve fitting around sleeve 14, for example, in which case either sleeve may be rotative and the adjusting device may be inverted, if desired. Also, the improved adjusting device may be used elsewhere as well as in leveling adjustments.

It should be appreciated that this invention in its broader aspects is not limited to specific embodiments herein illustrated and described, and that the following claims are intended to cover all changes and modifications that do not depart from the true spirit and scope of the invention.

What is claimed is:

1. A leveling device of the character described comprising a socket element having an airtight closed end and an open end; a sleeve received within said socket element, projecting from the open end thereof and in rotating, sealing engagement with the interior surface of the socket element, said sleeve having an internal thread, having an open end within the socket and having an airtight closed end external to the socket; a male screw within said sleeve in threaded engagement therewith and nonrotatably fixed to the closed end of said socket element; said male screw and the closed end of said sleeve forming a first, enclosed cavity and said sleeve and the closed end of said socket element forming a second enclosed cavity; the closeness of fit of said sleeve and socket element and of the threads of said sleeve and male screw being such as to substantially preclude the passage of air into and out of said cavities, whereby the entry of dust into said cavities is substantially precluded, thereby protecting said threads from becoming fouled but whereby compression and rarefaction of air within said cavities cannot be relieved by passage of air between said sleeve and socket element and between said threads; said male screw being formed with a longitudinal passage communicating said cavities to permit passage of air therebetween, said device also being formed with a lateral passage to communicate one of said cavities with the atmosphere.

2. The device of claim 1 wherein the socket element is in vertical position with its closed end at the top and its open end at the bottom, and said lateral passage is formed in said socket element to communicate said second cavity with the atmosphere.

3. The device of claim 1 in which said lateral passage is provided with a filter.

4. A leveling adjustment for dumpy levels and the like, comprising a star piece, a leveling plate, said star piece having a substantially horizontal arm containing a substantially vertical cylindrical cavity open at its lower end and closed at its upper end, an externally threaded screw coaxially and non-rotatively disposed within said cavity, an internally threaded sleeve rotatively fitted into the open end of said cavity and mating with said screw, the lower end of said sleeve being closed air-tight, said sleeve having a ball at its lower end, a socket mating with said ball, said socket bearing against the top of said leveling plate so that the spacing between said leveling plate and said arm of said star piece can be adjusted by rotating said sleeve, said cavity having a circumferential groove adjacent to its lower end, a resilient O-ring within said groove extending around and in close contact with said sleeve, said screw having an axial air passageway between its lower end and the upper end of said cavity, said star piece having an air passageway therein connecting the upper end of said cavity to the atmosphere, and an air filter within said air passageway of said star piece.

References Cited in the file of this patent
UNITED STATES PATENTS

| | | |
|---|---|---|
| 1,854,932 | Gottlieb | Apr. 19, 1932 |
| 2,046,982 | Warren | July 7, 1936 |
| 2,248,209 | Vacquier et al. | July 8, 1941 |
| 2,325,372 | Coffey | July 27, 1943 |
| 2,643,844 | Nette | June 30, 1953 |